Nov. 6, 1923.
L. CONBOY
1,473,466
CLUTCH LEVER ATTACHMENT FOR TRACTORS
Filed Jan. 23, 1923      2 Sheets-Sheet 1
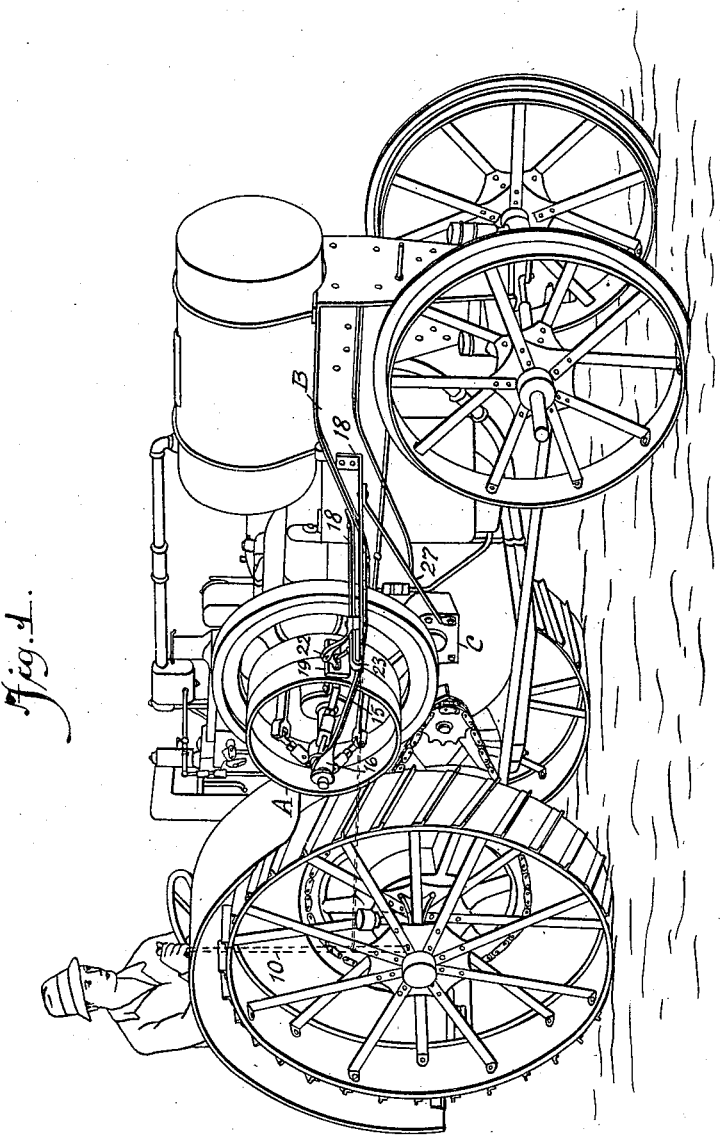
INVENTOR
Leyton Conboy

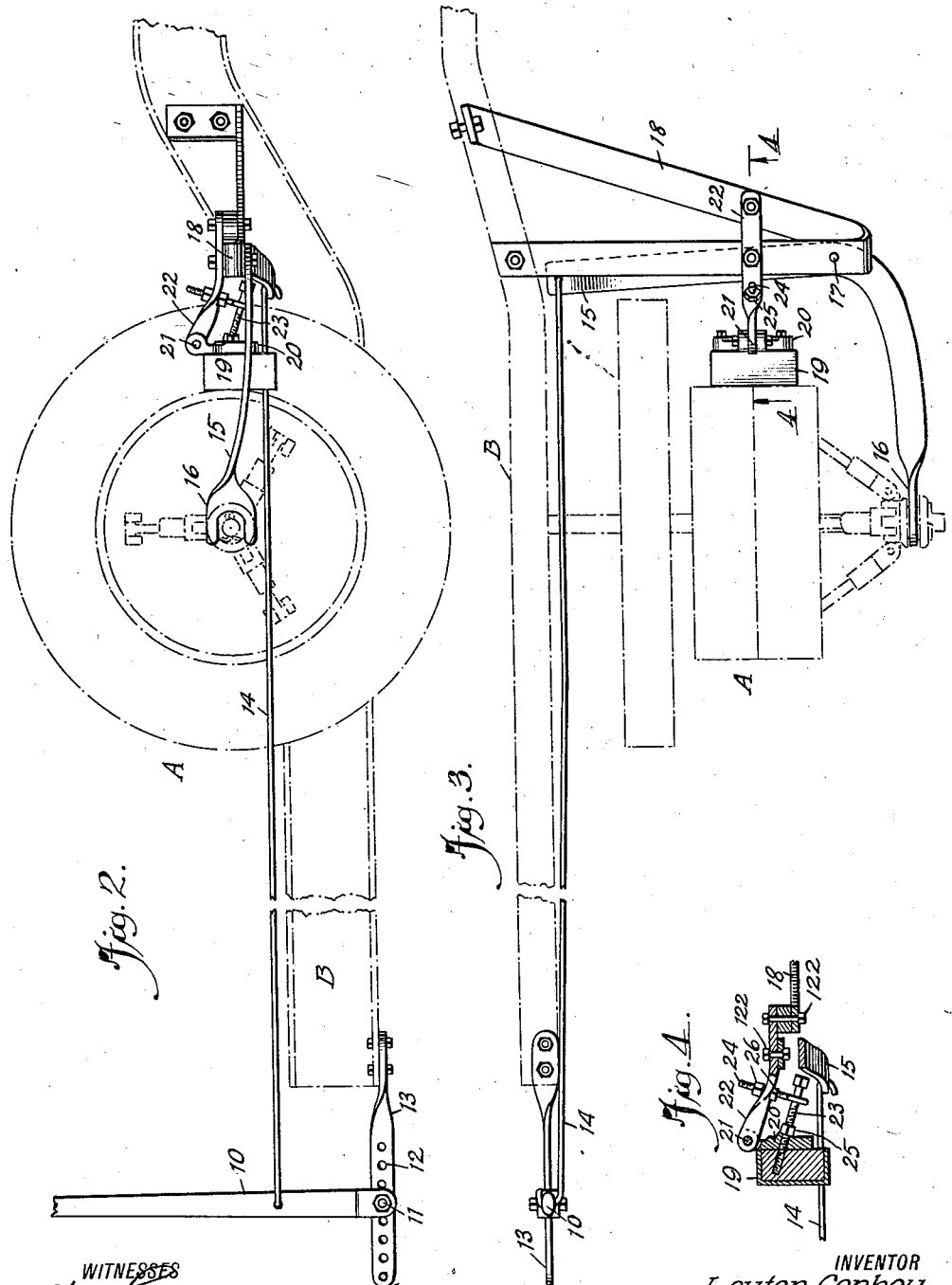

Patented Nov. 6, 1923.

1,473,466

UNITED STATES PATENT OFFICE.

LEYTON CONBOY, OF ASQUITH, SASKATCHEWAN, CANADA.

CLUTCH-LEVER ATTACHMENT FOR TRACTORS.

Application filed January 23, 1923. Serial No. 614,474.

*To all whom it may concern:*

Be it known that I, LEYTON CONBOY, a subject of the King of Great Britain, and a resident of Asquith, Saskatchewan, Dominion of Canada, have invented a new and Improved Clutch-Lever Attachment for Tractors, of which the following is a description.

My invention relates to the drive pulley of a tractor and particularly to the means for throwing the clutch in or out and applying and releasing the brake in unison with the operation of the clutch.

The general object of my invention is to provide a convenient attachment whereby the operator of the tractor can through the medium of a lever control the pulley clutch and brake with convenience, a more specific object being to provide a practical embodiment of the invention reflecting practical considerations looking to simplicity of the assemblage and facility of operation.

Reference is to be had to the accompanying drawings forming a part of this specification, it being understood that the drawings are merely illustrative of one example of the invention.

Figure 1 is a perspective view of a tractor showing an embodiment of my invention associated with the drive pulley;

Figure 2 is a side elevation of the attachment embodying my invention, a tractor pulley and frame part being indicated in dot-and-dash lines;

Figure 3 is a plan view of the attachment as applied;

Figure 4 is a detail in vertical section as indicated by the line 4—4, Figure 3.

In the illustration the letter A indicates the pulley of a tractor; B, a frame part; and C, the transmission case.

In carrying out my invention in accordance with the illustrated example I provide a hand lever 10 fulcrumed by a bolt 11 engaged in any one of a series of bolt holes 12 in a bracket 13 secured to the frame B. To said lever 10 between its fulcrum bolt and handle end is secured the rear end of a connecting rod 14, the forward end of which connects with one arm of a clutch lever 15 of bellcrank form having a clutch fork 16. Said clutch lever 15 is fulcrumed at the angle thereof by a vertical pin 17 on an approximately V-shaped bracket 18 secured to the frame B and extending laterally outward beyond the pulley A. The lever 10 is located adjacent the steering wheel of the tractor so that the operator may conveniently throw the lever. When said lever is thrown forwardly to rock the clutch lever 15 in one direction on its pin 17 the clutch fork 16 will be moved laterally inward to operate the usual clutch of the pulley A and when the lever 10 is thrown rearwardly, the clutch lever 15 will be moved to disengage the pulley clutch.

The operation of the clutch lever 15 serves to apply and release the brake shoe 19 which has a back plate 20 or equivalent fixed part appurtenant thereto which is pivotally secured as at 21 to a fixed bracket 22 bolted or otherwise rigidly secured to the main bracket 18 as by bolts 122. A screw or bolt 23 has threaded engagement with the brake shoe 19 and its back plate 20 and is supported in an eye bolt 24. The screw or bolt 23 has a set nut 25 and the eye bolt 24 has set nuts 26, the arrangement permitting the adjustment of the screw 23 so that its head lies in the path of movement of the clutch lever 15, whereby said clutch lever will contact with the said screw 23 to throw the brake shoe 19 against the pulley A or permit the shoe 19 to gravitate away from said pulley. Thus, through the medium of the hand lever 10 the clutch of the pulley A is engaged or disengaged and simultaneously the brake shoe 19 is released with the clutching of the pulley and applied with the unclutching of the pulley. A brace 27 may extend from the bracket 18 to any fixed part of the tractor as for example the transmission case C.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. An attachment for tractors comprising a hand lever, means to fulcrum said lever on a fixed part of the tractor at the rear of the tractor for operation by the operator, a connecting rod extending forwardly from said lever, a clutch lever connected with said rod adapted to engage or disengage the clutch of the drive pulley of the tractor, and means to mount said clutch lever on a fixed part of the tractor; together with a brake shoe, means for mounting said brake shoe on the supporting means for said clutch lever, and means in the path of movement of the clutch lever to be engaged by the latter for throwing said brake shoe into engagement with the pulley.

2. An attachment for tractors comprising a lever, means for mounting the same on a fixed part of the tractor for operation by the operator of the tractor, a clutch lever arranged to engage or disengage the clutch of the drive pulley of the tractor, and an operative connection between the first-mentioned lever and the clutch lever; together with a brake, and means to apply the brake with the release of the pulley clutch by said clutch lever, and permit the brake to move to release position with the engagement of said clutch.

3. An attachment for tractors comprising a hand lever, means to fulcrum said lever on a fixed part of the tractor at the rear of the tractor for operation by the operator, a connecting rod extending forwardly from said lever, a clutch lever connected with said rod adapted to engage or disengage the clutch of the drive pulley of the tractor, and means to mount said clutch lever on a fixed part of the tractor; together with a brake shoe, means to mount said brake shoe for movement toward or from the tractor pulley, a member on said brake shoe disposed in the path of movement of the clutch lever for applying the brake when the clutch is released and permit the shoe to gravitate to release position when the clutch is engaged, said brake shoe member being adjustable relatively to the clutch lever.

4. An attachment for tractors comprising a hand lever, a bracket adapted to fulcrum said lever on a fixed part of the tractor adjacent to the rear end, a connecting rod extending forwardly from said lever adjacent to the tractor drive pulley, a clutch lever of bellcrank form to one arm of which said connecting rod is secured, said clutch lever having a fork to actuate the pulley clutch, and a bracket having arms adapted to be secured to the frame of the tractor to extend laterally outward beyond the pulley, said clutch lever being fulcrumed on said bracket; together with a second bracket rigid on the first bracket, a brake shoe pivotally hung on the second-mentioned bracket, and a member projecting from the brake shoe into the path of movement of the clutch lever for engagement by the latter.

5. A tractor attachment including a hand lever, means to fulcrum said lever on a fixed part of the tractor at the rear for operation by the operator of the tractor, a connecting rod extending forwardly from said lever, a second lever to which the forward end of the connecting rod is secured, a bracket to which said second lever is fulcrumed, a brake shoe to engage the tractor pulley, means to pivotally support said brake shoe on said bracket, and means on the brake shoe adapted to be engaged by said second lever.

6. A tractor attachment including a hand lever, means to fulcrum said lever on a fixed part of the tractor, at the rear, for operation by the operator of the tractor, a connecting rod extending forwardly from said lever, a second lever to which the forward end of the connecting rod is secured, a bracket to which said second lever is fulcrumed, a brake shoe to engage the tractor pulley, means to pivotally support said brake shoe on said bracket, a member having threaded engagement with the brake shoe and disposed in the path of movement of said second lever, said member being adjustable longitudinally to vary its relation to said second lever, and a fixed guide appurtenant to said bracket through which said adjustable brake shoe member freely extends.

LEYTON CONBOY.